(12) United States Patent
Jacobson et al.

(10) Patent No.: US 7,206,925 B1
(45) Date of Patent: Apr. 17, 2007

(54) BACKING REGISTER FILE FOR PROCESSORS

(75) Inventors: Quinn A. Jacobson, Sunnyvale, CA (US); Chiao-Mei Chuang, Saratoga, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 499 days.

(21) Appl. No.: 09/643,895

(22) Filed: Aug. 18, 2000

(51) Int. Cl.
*G06F 9/34* (2006.01)

(52) U.S. Cl. ...................... 712/225; 712/227

(58) Field of Classification Search ............... 712/225, 712/227, 228
See application file for complete search history.

(56) References Cited

U.S. PATENT DOCUMENTS

| | | | |
|---|---|---|---|
| 5,568,380 A * | 10/1996 | Brodnax et al. | 700/79 |
| 5,684,983 A | 11/1997 | Ando | 395/566 |
| 5,852,726 A | 12/1998 | Lin et al. | 395/376 |
| 5,900,025 A * | 5/1999 | Sollars | 712/248 |
| 5,956,747 A * | 9/1999 | Wilhelm et al. | 711/140 |

OTHER PUBLICATIONS

Wikipedia, the free encyclopedia. http://en.wikipedia.org/wiki/Main_Page Search term: register window.*
InstantWeb. Free Online Computing Dictionary. © 1994-1999. http://www.instantweb.com/foldoc/index.html search terms: register and register set.*

* cited by examiner

*Primary Examiner*—Eddie Chan
*Assistant Examiner*—Aimee J Li
(74) *Attorney, Agent, or Firm*—Martine Penilla & Gencarella, LLP

(57) ABSTRACT

A processor is defined by a new architectural feature called a Backing Register File, where a Backing Register File is a set of randomly accessible registers capable of holding values, and further are directly connected to the processor's register files. The processor's register files are in turn connected to the processor's execution units. A Backing Register File is visible and controllable by users, allowing them to make use of a larger local address space increasing execution unit throughput thereby, while not changing the size of the processor's register files themselves.

11 Claims, 6 Drawing Sheets

BACKING REGISTER FILE FOR PROCESSORS

BACKGROUND OF THE INVENTION

1. Field of the Invention

This invention pertains generally to processor architecture, focussing on the register files used by execution units. More particularly this invention is directed to an improved processor using a hierarchical register file architecture, where the hierarchical register files are visible at the macro-architecture level, facilitating improved performance and backwards compatibility in a processor instruction set.

2. The Prior Art

As reliance on computer systems has increased so have demands on system performance. This has been particularly noticeable in the past decade as both businesses and individual users have demanded far more than the simple character cell output on dumb terminals driven by simple, non-graphical applications typically used in the past. Coupled with more sophisticated applications and internet use, the demands on the system and in particular the main processor are increasing at a very high rate.

As is well known in the art a processor is used in a computer system, where the computer system as a whole is of conventional design using well known components. An example of a typical computer system is the Sun Microsystems Ultra 10 Model 333 Workstation running the Solaris v.7 operating system. Technical details of the example system may be found on Sun Microsystems' website.

A typical processor is shown in block diagram form in FIG. 1. Processor 100 contains a Prefetch And Dispatch Unit 122 which fetches and decodes instructions from main memory (not shown) through Memory Management Unit 110, Memory Interface Unit 118, and System Interconnect 120. In some cases, the instructions or their operands may be in non-local cache in which case Prefetch And Dispatch Unit 122 uses External Cache Unit 114 to access external cache RAM 116. Instructions that are decoded and waiting for execution may be stored in Instruction Cache And Buffer 124. Prefetch And Dispatch Unit 122 detects which type of instruction it has, and sends integer instructions to Integer Execution Unit 126 and floating point instructions to Floating Point Execution Unit 128. The instructions sent by Prefetch And Dispatch Unit 122 contain register addresses, typically two read locations and one write location, where the read locations are the values to be operated on and the write location is where the result will be stored.

FIG. 1 has one integer and one floating point execution unit. To improve performance parallel execution units were added. One parallel execution unit implementation is shown in FIG. 2. To avoid the confusion and surplus verbiage caused by the inclusion of non-relevant portions of the processor, FIG. 2 and the drawings following it show only the relevant portions of a processor. As will be appreciated by one of ordinary skill in the art, the portion of a processor shown is functionally integrated into the rest of a processor.

A register file, Integer Register File 200, is shown connected to Integer Execution Units 208 and 210 through Bypass Circuit 204. There may be any practicable number of additional integer execution units between Integer Execution Units 208 and 210. Another register file, Floating Point Register File 202, is shown connected to Floating Point Execution Units 212 and 214 through Bypass Circuit 206. As with the integer execution units, there may be any practicable number of additional floating point execution units between Floating Point Execution Units 212 and 214.

Bypass circuits are needed because it can be the case that one execution unit is attempting to both read a value and write a result to a particular register, or one execution unit may be reading a register in its corresponding register file while another is trying to write to the same register. Depending on the exact timing of the signals as they arrive over the data lines from one or both execution units, this can lead to indeterminate results. Bypass Circuits 204 and 206 detect this condition and arbitrate access. The correct value is sent to the execution unit executing a read, and the correct new value into is written into the register.

The circuitry needed to do this is complex for more than one execution unit, being dependant on the number of register ports attached to one register file. Generally, the complexity of the bypass circuitry rises as the square of the number of register ports a register file has; for n register ports on a register file the complexity of the bypass circuitry rises as $n^2$.

In addition to the complexity associated with the number of attached execution units and bypass circuitry, a primary bottleneck on the size of register files is the number of ports that must be made available to read and write the registers. The complexity associated with the number of ports is proportional to the square of the total number of ports on a register file. Since there are typically two read operations for every write operation (i.e., most instructions read two values from a register file and write a resulting value), register files typically have two read ports for every write port. If a register file has 8 read ports and 4 write ports, its relative order of complexity would be on the order of $(8+4)^2=144$ with 12 ports, when compared to other register files with other numbers of ports. Using the same register file and trying to increase its throughput by increasing the number of ports, as an example increasing the number of read ports by 4 and the number of write ports by 2, yields a relative order of complexity of $(12+6)^2=324$ with 18 ports. As an alternative, adding a duplicate of the original register file yields a relative order of complexity of $(8+4)^2+(8+4)^2=244$ with 24 ports. Thus, using more register files with fewer ports per register file adds less complexity with more ports (for more throughput) than trying to increase the number of ports on a single register file.

In addition to the complexity just discussed, there are other considerations that limit the size of register files. One problem is physically adding more address and data lines, and the extra length and longer propagation times associated with the extra length. This is a concern since a register file is usually doubled in size with each increase. The accompanying increase in the number of address and data lines, and the increase in individual lengths and associated propagation delays, run directly counter to the need to increase clock speeds in the processor.

Another problem is addressing the individual registers. To address each of 32 registers in a typical register file requires 5 bits. An example of this addressing may be found in Sun Microsystems UltraSPARC II processor, technical details being available on Sun's website. Each instruction typically has addresses for two values to be read and operated on, and one address to write the resulting value into. Thus, for register files having 32 registers, a total of 15 bits (5 per address) must be allocated per instruction out of a limited number of bits available in each instruction. To add larger register files, for example to make the register files in an UltraSPARC II processor 64 registers long instead of 32 registers, requires that additional bits in each instruction be permanently allocated for addressing. In the case of registers with 64 registers, an additional address bit per address field is needed over register files with 32 registers, for a total of 3 additional bits per instruction. This is a real problem when improvements are being made to an existing architecture. Typically, each word in the existing instruction set is full (all the bits are in use), so no more bits can be allocated to addressing. Even if some instructions have unused bits, it must be the case that the extra address bits be available in all instructions. If they aren't, this causes other problems such as adding considerable complexity and lack of backward compatibility into microcode.

For the reasons just discussed, adding register file space by increasing the size of the register file is not practical.

In spite of the problems just discussed, the increased parallelism achieved by connecting multiple execution units to one register file has added pressure to increase the number of registers available. Each execution unit may wish to use anywhere from one or more depending on the instructions and operands it is using. This leads to a contention for register space between the execution units, and limits the number that can be connected before there are diminishing returns due to the lack of registers available.

Thus, there are restrictions that necessitate keeping register files at their current size, yet there is a tremendous need for more locally available registers as well.

It is therefore a goal of this invention is to provide a method and system for increasing the throughput of execution units connected to register files by increasing the amount of locally available registers. The goals of increasing the number of locally available registers in the present invention must be achieved without increasing the size of the register files currently in use.

BRIEF DESCRIPTION OF THE INVENTION

A device and method to increase the throughput of a processor, specifically increasing the throughput of execution units, is disclosed herein. A new architectural feature is added called a backing register file which is directly coupled with the register files, the register files being attached to the execution units in a processor. The backing register file is explicitly visible to users and may be controlled by users. Using the Backing Register File allows users to move values between it and any of the processor's register files, providing a larger register file from which values can be loaded or stored and be ready for immediate use. The Backing Register File may also be used to fetch values from main memory before an execution unit needs them, potentially saving considerable time (preventing stall).

BRIEF DESCRIPTION OF THE DRAWING FIGURES

DETAILED DESCRIPTION OF PREFERRED EMBODIMENTS

A person of ordinary skill in the art will realize that the following description of the present invention is illustrative only and not in any way limiting. Other embodiments of the invention will readily suggest themselves to such skilled persons having the benefit of this disclosure.

When viewing the figures, it is intended that similar designations used in this disclosure are intended to designate substantially similar matter.

Figure 3:
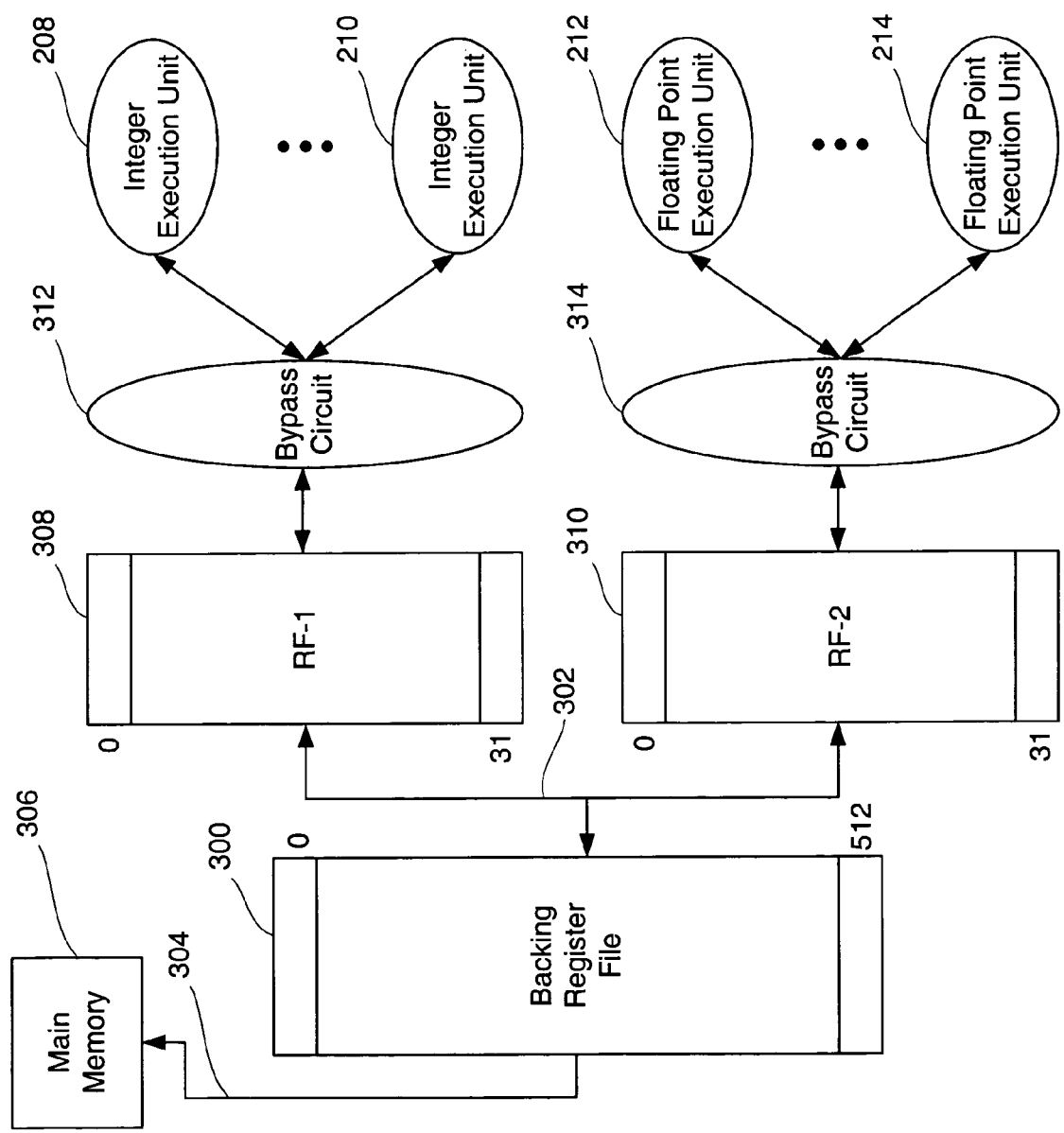
FIG. 3 is a block diagram showing a backing register file according to the present invention.

Referring now to FIG. 3, Register Files 308 and 310, and Bypass Circuits 312 and 314 are shown. They perform similar functions as Register Files 200 and 202, and Bypass Circuits 204 and 206. However, due to the extra connections of Backing Register File 300 the design and implementation will need to be different than the prior art. Integer Execution Units 208 and 210 are shown, potentially having a number of addition integer execution units between them, and Floating Point Execution Units 212 and 214 are also shown and also may have a number of additional floating point execution units between them.

Figure 2:
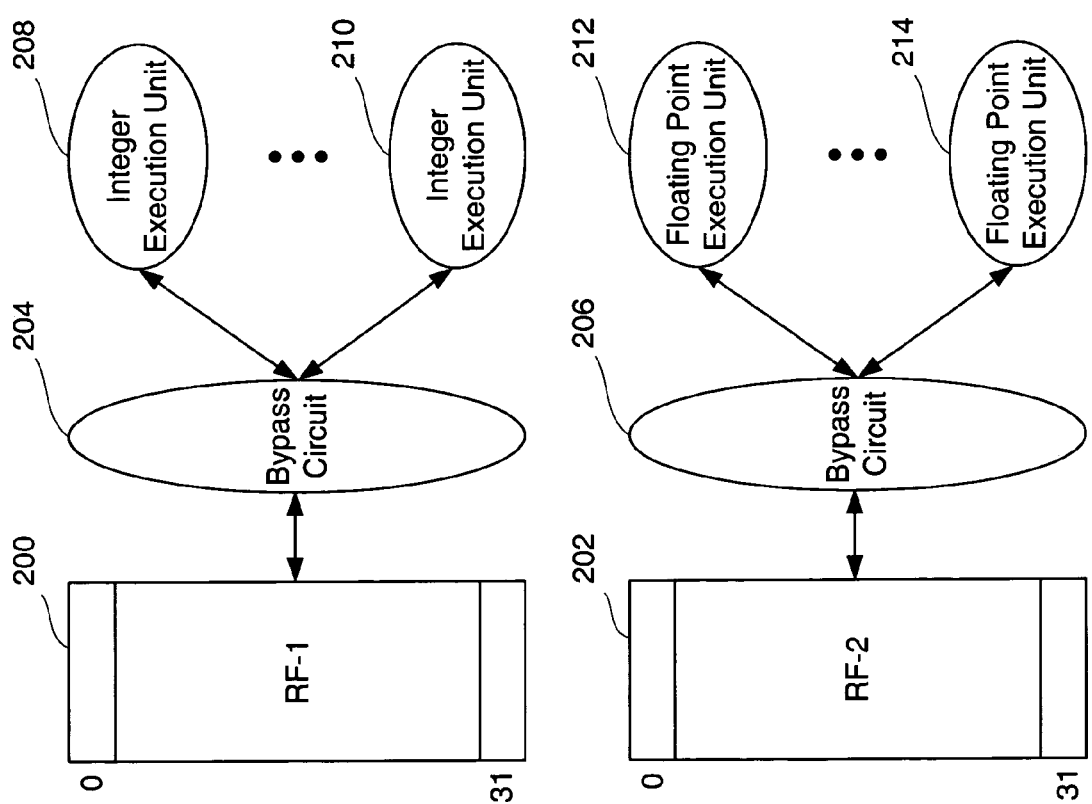
FIG. 2 is a block diagram showing parallelism implemented in a prior art processor.

Backing Register File 300 is added to create more local register storage, while not increasing the size of existing Register Files 308 and 310 as compared to Register Files 200 and 202 in FIG. 2. As shown in FIG. 3, there is no direct connection between Backing Register File 300 and Execution Units 208, 210, 212, and 214. Thus, the complexity of Bypass Circuits 312, 314, like those mentioned in the Background section above, is not affected by the presence of Backing Register File 300 and Backing Register File 300 is therefore inaccessible to the execution units. Connection 302 is a full set of address and data lines, allowing Backing Register File 300 the ability to address and access individual registers in each of the Register Files 308 and 310. It will also be the case that the same connectivity will be present between Baking Register File 300 and any register files implemented in a particular processor.

Figure 1:
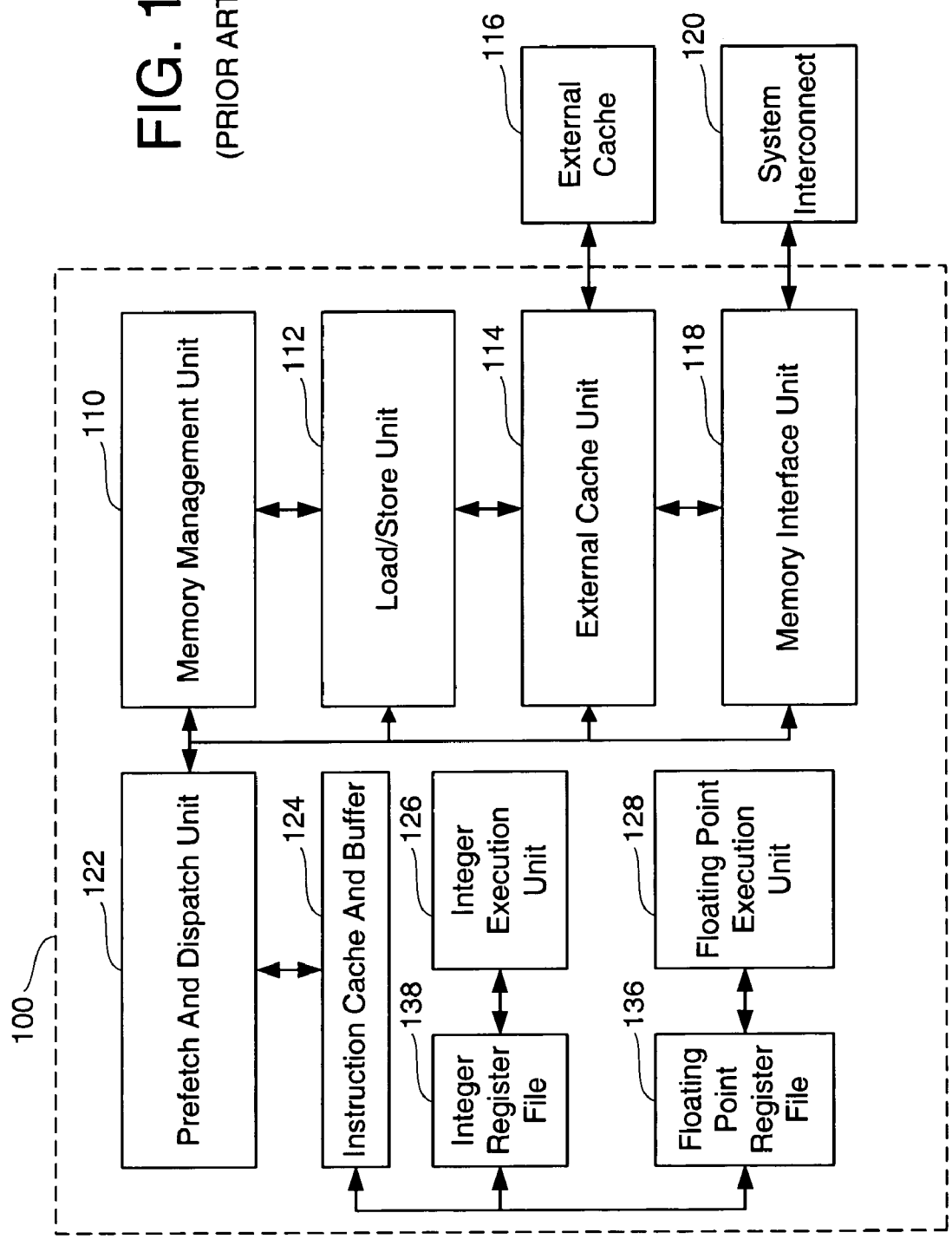
FIG. 1 is a block diagram of a prior art processor.

Backing Register File 300 may also be connected to Main Memory 306 through Connection 304. As will be readily understood by those of ordinary skill in the art and with the benefit of the present disclosure, Main Memory 306 is not located on the processor chip and Connection 304 is comprised of a series of connections and interfaces both on and off the chip as more fully described in FIG. 1, with Main Memory 306 being of conventional and well known design. It is expected that cost conscious implementations will not implement a connection between Main Memory 306 and Backing Register File 300, while implementations where performance has precedence over cost may make use of the extra speed available by having a more direct connection between Backing Register File 300 and Main Memory 306.

Backing Register File 300, being connected to both Register Files 308 and 310, may be used to hold, store, pre fetch, and temporarily buffer values in a way that will compliment the number of registers available locally to both the integer execution units and the floating point execution units. This will be particularly useful in holding values that are going to be used again in the instruction stream. By temporarily holding register values that would have been written to main memory considerable time is saved. Another saving occurs when a set of instructions need to operate on a series of operands but when loading all the operands would preclude other execution units from allocating the space they need for normal execution. It is expected that under normal use, a significant portion (well over half) of the instructions executed by the execution units will not need to make use of Backing Register File 300. Those that do will use Backing Register File 300 as just described, such as for temporary storage instead of using main memory, or to prefetch or preload values into Backing Register File 300 in preparation for execution.

As mentioned above, Backing Register File 300 is especially useful when values would ordinarily have been transferred between execution units and main memory. Communicating with main memory is a long process (many processor clock cycles), which could cause a stall state in one or more execution units as the values are read or written between Register Files 308 or 310 and Main Memory 306. However, with Backing Register File 300 the chances of going into a stall state may be eliminated or at least minimized by using it to temporarily store results, or to hold prefetched values from Main Memory 306 in preparation for the instruction that needs those values. Backing Register File 300 can be used to release execution units and their associated register files as soon as values are written out from Register Files 308 or 310 to Backing Register File 300, and then letting the values in Backing Register File 304 be written to Main Memory 306 using the needed additional clock cycles. This is but one example of how Backing Register File 300 can be used to minimize the time execution units spent being in a stall state, with many more ways of streamlining instruction execution by the use of more registers being readily apparent to those of ordinary skill in the art and having the benefit of the present disclosure.

In a significant departure from the prior art, the present invention crosses the micro-architecture/macro-architecture boundary. Backing Register Files 300 are visible outside the processor and are expected to be explicitly used by programs at all privilege levels. Backing Register File 300 use by programs can take many forms. The two most common usages will be programs compiled by smart compilers and, for high performance applications, directly by programmers.

As is well known in the art, sequences of instructions constitute one or more instruction stream or streams, where the instruction streams originate from a program or from more than one program. When used in this disclosure, the concept of a program using the Backing Register includes reference to the instruction stream corresponding to the program from which it originates. In addition, when referring to a program using the present invention "program" includes all programs from any source, including user-originated and system originated, privileged and non-privileged. When discussing a user-visible instructions contained in a user program, the intent is to include any and all instructions originating from any program, where "user" refers to any program using a processor encompassing the present invention. Thus, "user" is from the processor's view-point where any program uses the processor is a user. This covers the traditional notion of a "user" program which is running on top of (outside of) the operating system, but also includes any other instruction originating from outside the processor—including instructions originating from an operating system or an application-layer program at any level.

Figure 4:
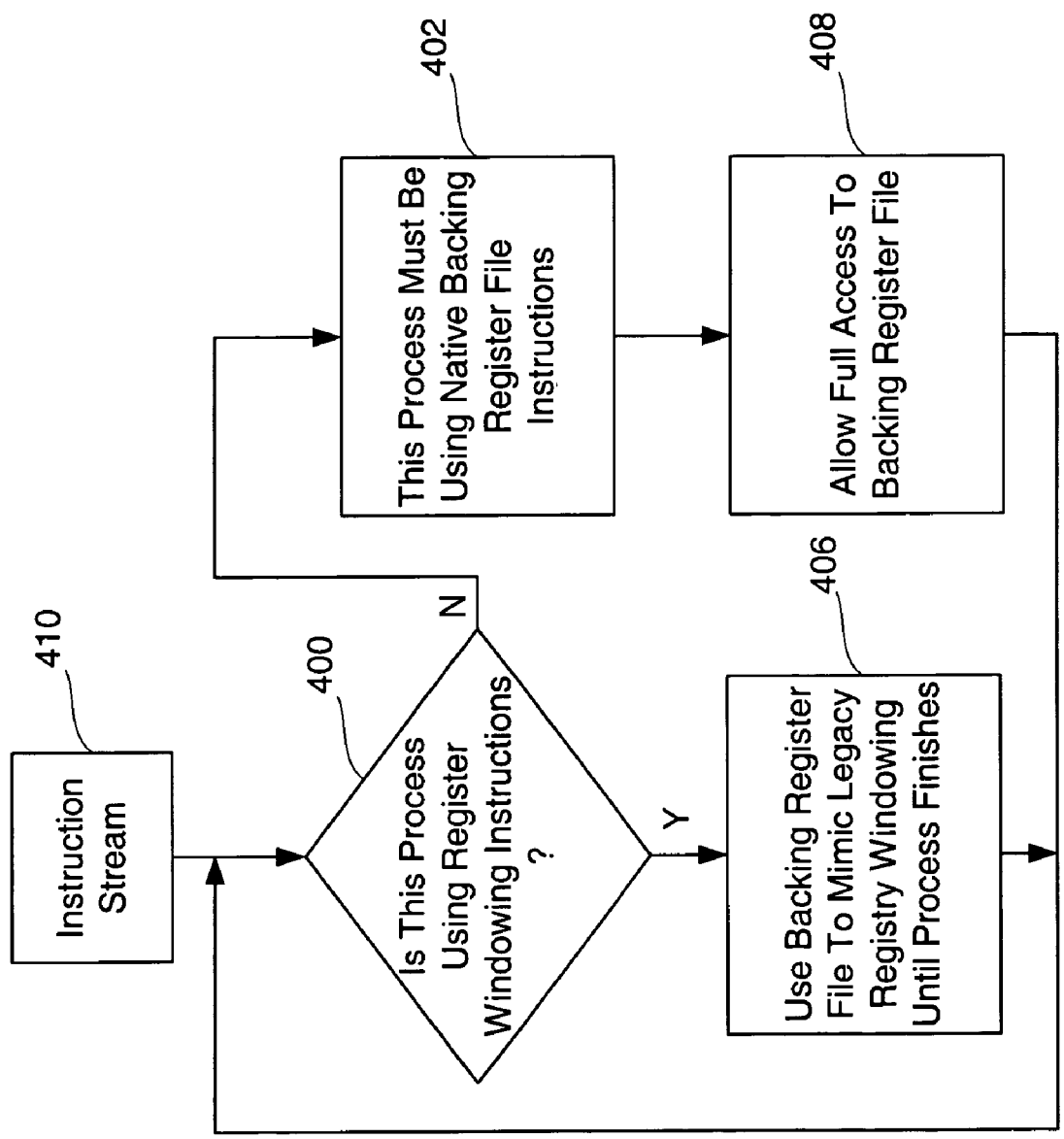
FIG. 4 is a flowchart example of initializing the present invention.

Referring now to FIG. 4, a flow diagram shows one way to initialize the use of Backing Register File 300. As a process begins to run, it will send an instruction stream 410 to the processor. The processor will initialize the Backing Register File 300 for use by looking for specific instructions in the instruction stream 410.

As the instruction flows through the processor, any instructions dealing with the Backing Register File 300 are sent to diamond 400. Diamond 400 checks for the presence of Register Windowing instructions.

Register Windowing is a way of using registers that are not in a Register File. Register Windowing is a legacy of Sun Microsystems in its earlier SPARC Processors, further technical information being available from Sun Microsystems on its website. Register Windowing does not have the ability of being able to be randomly accessed over the address space. It uses a base address and makes available a small preset number of registers. Its primary use was to pass parameters for subroutine or function calls. Backing Register File 300 can emulate the behavior of Register Windowing, making Backing Register File 300 backwards compatible with Register Windowing technology and the legacy software that still uses it. Register Windowing emulation capability is a bonus feature of processor architectures that use Backing Register File 300 technology, but is not strictly necessary to practice aspects of the inventive features of the present invention. In an implementation without Register Windowing the steps of 400, 406, and 402 would not be used.

If Register Windowing instructions are found in the instruction stream 410 coming from a process, Backing Register File 300 will be used, together with supporting microcode, to emulate Register Windowing actions. This is shown in block 406. It will be set in that mode and used that way for the remainder of the time the current process has control of the processor. As soon as the current process no longer has control of the processor, the method will continue back to diamond 400, ready to process further Backing Register instructions.

If no Register Windowing instructions are found, the instruction stream 410 must contain Backing Register File 300 instructions at block 402. This is because there are, basically, only two types of Backing File instructions—one for the Register Windowing capability and one to use the Backing Register File in its native mode. Block 402 is exited to block 408. In block 408 Backing Register File 300 is made fully available to the current process in its native mode. "Native mode" refers to the ability to address each and every register in Backing Register File 300 using its own addresses and at random. When the current process no longer has control of the processor, block 408 is exited and diamond 400 entered, ready to continue processing further Backing Register File 300 instructions.

Figure 5:
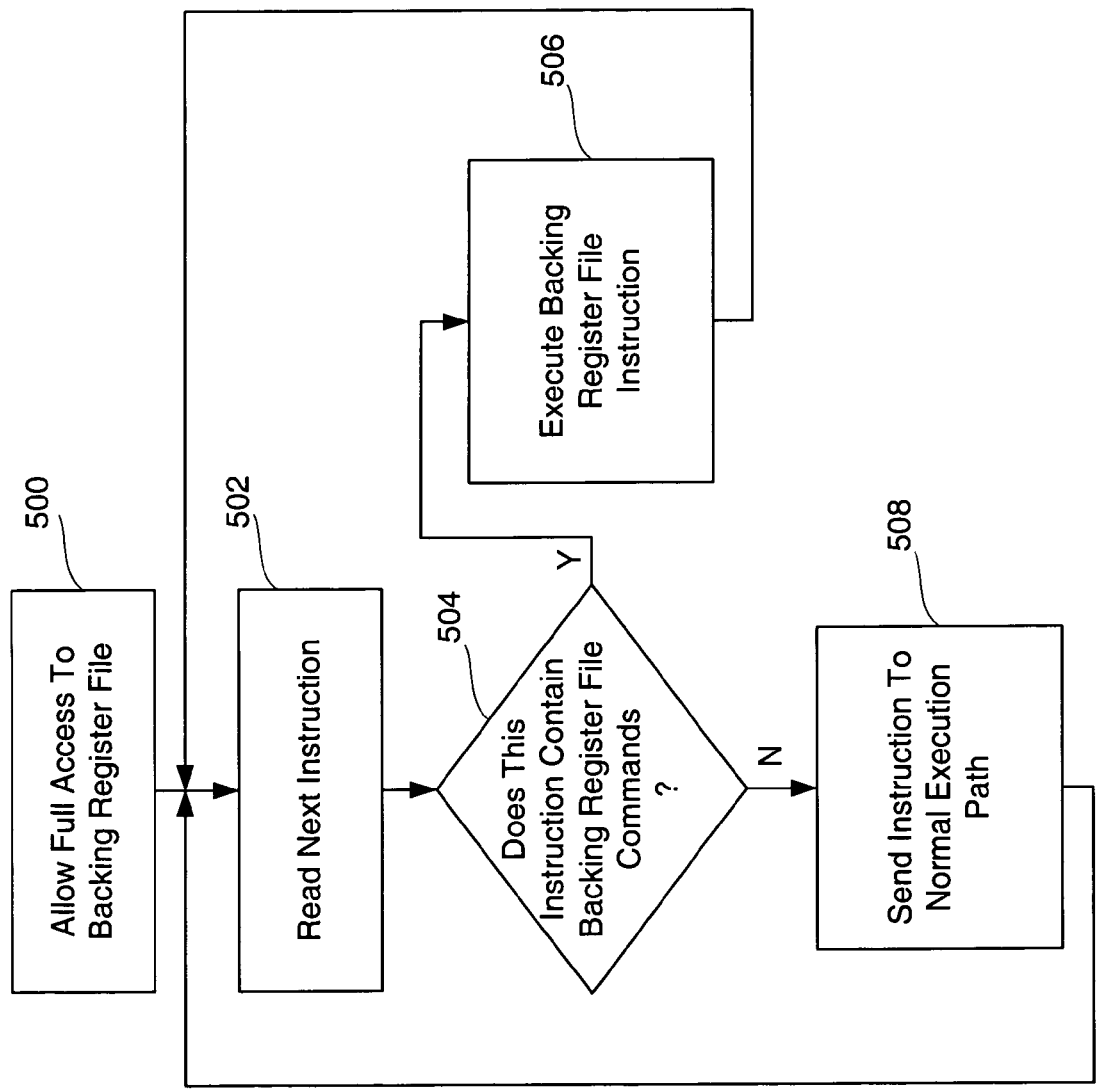
FIG. 5 is a flowchart showing use of the backing register file of the present invention.

Referring now to FIG. 5, the process using the processor has sent an instruction making explicit use of Backing Register File 300 and so put the processor in the state shown in step 500—allowing full access. As the process sends its instruction stream to the processor, each instruction will be checked to see if it is directed to Backing Register File 300 explicitly. If not, step 508 is invoked and the instruction is sent for normal execution. If yes, step 506 is invoked where the specific action requested in the instruction is either carried out start to finish (e.g., moving a single register value from Backing Register Store 300 to Register File 200) or started (e.g., sending a request for values currently stored in main memory). The instruction determines if it will wait, which puts the execution unit into a stall state if the instruction must wait until its operands arrive. Following step 508, the process begins again at step 502. As will be clear to those of ordinary skill in the art with the benefit of the present disclosure, this illustrative flowchart is not really an endless loop. Either the process sending the instruction stream will finish, in which case step 508 is passed but the result of sending the instruction to normal execution terminates the process, or the current process is preempted.

In using Backing Register File 300, a user will issue either some kind of Register Windowing instructions or will request a transfer of register values between register files, main memory, local cache, and Backing Register File 300. This is accomplished using Backing Register File 300 instructions in a program. The data needed to fully accomplish the intended actions will be stored in data structures, and then communicated to the processor using an extended instruction set (Backing Register File 300 instructions recognized in step 504 in FIG. 5).

In the case of the UltraSPARC processor, the standard SPARC instruction set, called SPARC-V9, is documented in *The SPARC Architecture Manual, Version* 9 and is available from Sun Microsystems. An implementation of the present invention on an UltraSPARC processor would include both the Backing Register File 300 structure disclosed herein and an extended instruction set consisting of instructions that move individual or groups of register values between a backing register file and any register files present, and between a backing register file and main memory. In addition, a set of instructions that emulate Register Windowing would be implemented. The extended instruction set will also have address fields containing enough bits to address the significantly larger address space of a backing register file.

In actual implementation, the extension needed for instruction sets such as SPARC-V9 is very manageable. Only a relatively small number of additional instructions would be needed to make full use of the backing register file. The added instructions would typically have only one source and destination address per instruction, as the new instructions will be "move" instructions rather than "operation" instructions. This means the new instructions will be able to be encoded in the pre-existing instruction length. Thus, to make full use of a backing register file as described and disclosed in the present invention requires an extended instruction set that will be able to make use of the pre-existing instruction length, and will be implementable with relatively few new instructions. This constitutes a significant functionality gain with relatively little additional complexity added in the extended instruction set, constituting another significant advantage of the present invention.

An implementation of the present invention on a non-UltraSPARC processor would include both the device as described above and an extended instruction set consisting of instructions that move individual or groups of register values between a backing register file and all implemented register files, and between a backing register file and main memory, but without instructions that emulate Register Windowing. As stated in the last paragraph, the extended instruction set will have address fields containing enough bits to address the significantly larger address space of whatever size backing register file is implemented.

In the case of a new processor the instructions to direct the working of the Backing Register File would be built into the standard instruction set.

Figure 6A:
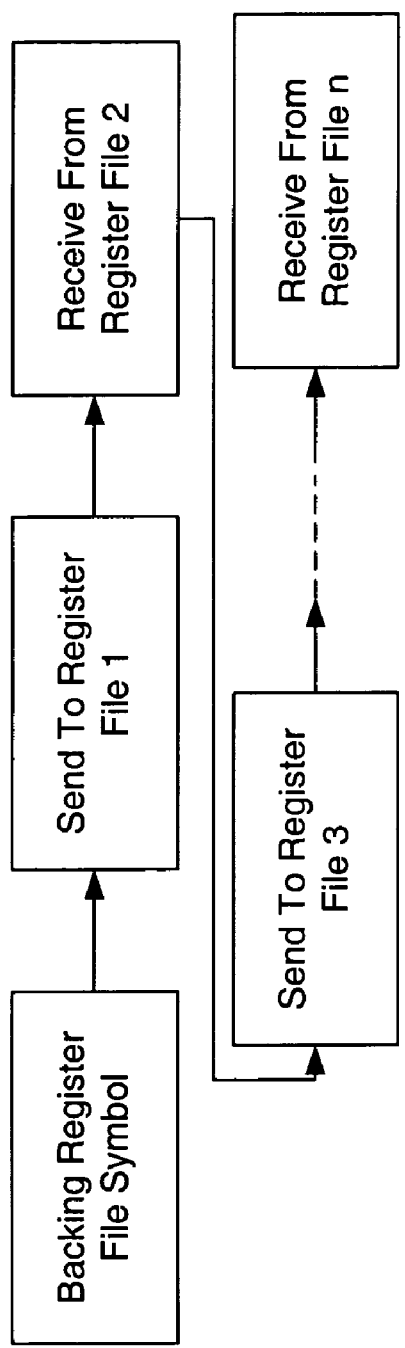
FIG. 6a is a data structure that may be used with the present invention.
Figure 6B:
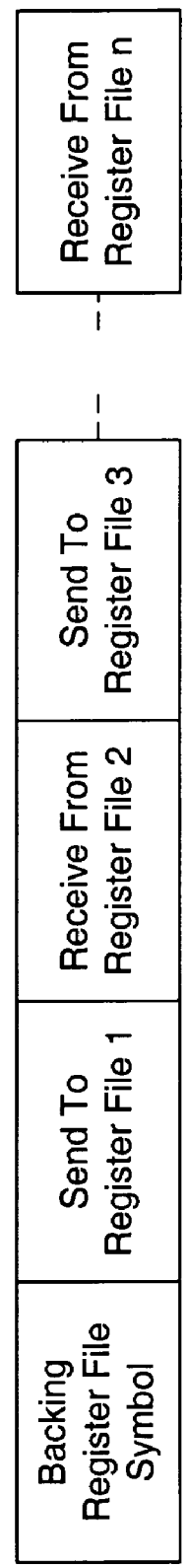
FIG. 6b is a data structure that also may be used with the present invention.

FIG. 6a shows one possible data structure for requesting sets of instructions to be sent to a Backing Register File 300. There are a set of fields of pre-defined type and length plus a header field, organized as a singly linked list. In this case, the addresses of registers to read or write from the Backing Register File 300 to or from Register File 1 are contained in the first linked field, the addresses to read or write from the Backing Register File 300 to or from Register File 2 are contained in the second linked field, and so on until the registers to read and write from the Backing Register File to or from Register File n are in linked field n. Another data structure implementation is shown in FIG. 6b, where the linked list with explicit pointers is replaced by a set of fields of specified length in a byte stream, such as two bytes, where every n-th field contains addresses of registers to read or write from the Backing Register File to or from Register File n, and where the entire set of fields is contained in one or two words (e.g., 64 bits which is either two 32-bit words or one 64-bit word).

As will be readily apparent to a person of ordinary skill in the art and having the benefit of the present disclosure, there will be a large number of possible ways of representing the way in which data will be communicated between the Backing Register File and the Register Files, and between the Backing Register File and Main Memory. All such implementations are contemplated by the present invention, and may be used while staying within the spirit of the disclosure.

The present invention relates to processor architecture at both the micro and macro levels, and further relates to an extended instruction set providing explicit (macro level) use of the inventive aspects of the processor architecture. The present invention also encompasses machine readable media on which are stored embodiments (data structures) of the information to be communicated between the processor and a process using the Backing Register File. It is contemplated that any media suitable for retrieving instructions is within the scope of the present invention. Examples would include magnetic, optical, or semiconductor media.

While embodiments and applications of this invention have been shown and described, it will be apparent to those skilled in the art with the benefit of the present disclosure that many more modifications than mentioned above are possible without departing from the inventive concepts contained herein. The invention, therefore, is not to be restricted except in the spirit of the associated claims.

What is claimed is:

1. A processor, comprising:
   at least one register file;
   at least one execution unit coupled to the at least one register file, the at least one register file being available to programs for temporarily storing operands and results;
   at least one bypass circuit operatively coupled to said at least one register file and said at least one execution unit, said at least one bypass circuit capable of arbitrating access by said at least one execution unit to said at least one register file; and
   a backing register file comprising a plurality of registers, the backing register file being operatively coupled to said at least one register file, said backing register file being inaccessible to the at least one execution unit and, in at least one mode, is always visible outside the processor and is directly accessible to instructions in the programs at any privilege level.

2. The processor of claim 1, wherein the at least one register file comprises a plurality of register files, each execution unit of the at least one execution unit being operably connected to only one register file of said plurality of register files, said backing register file being operably connected to each register file of said plurality of register files thereby allowing a transfer of values from any designated location in any designated register file of said plurality of register files to any designated location in said backing register file, and from any designated location in said backing register file to any designated location in any designated register file of said plurality of register files.

3. The processor of claim 1, further comprising
a first connection operably connected to said backing register file from each of the at least one register file, the first connection comprising a full set of address and data lines allowing the backing register file to address and access individual registers and each of the at least one register file; and
a second connection operably connected to a main memory from the said backing register file, the connection circuit providing a series of connections and interfaces placing the backing register file in communication with the main memory.

4. The processor of claim 1 wherein the backing register file is further operable in a windowing mode wherein the backing register file mimics register windowing functionality wherein less than all the registers in the backing register file is accessible to a particular process at one time.

5. The processor of claim 4 wherein the backing register file operates in one of the windowing mode or the native mode depending upon instructions in a current instruction stream of a current process, wherein when the instruction stream includes register windowing instructions, the backing register file operates in the windowing mode, and when the instruction stream does not include register windowing instructions then the backing register file operates in the native mode.

6. The processor of claim 1, wherein each of the plurality of registers is accessible at random using a uniquely assigned address.

7. A backing register file for a processor, the backing register file comprising a plurality of registers, the backing register file being operatively coupled to at least one register file, the at least one register file being operatively coupled to at least one execution unit, said backing register file being inaccessible to the at least one execution unit and, in at least one mode, the backing register file is always visible outside the processor and is directly accessible to instructions in the programs at any privilege level.

8. The backing register file of claim 7, wherein the at least one register file comprises a plurality of register files, said backing register file being operably connected to each register file of said plurality of register files thereby allowing a transfer of values from any designated location in any designated register file of said plurality of register files to any designated location in said backing register file, and from any designated location in said backing register file to any designated location in any designated register file of said plurality of register files.

9. The backing register file of claim 7, wherein the backing register file is further operable in a windowing mode wherein the backing register file mimics register windowing functionality wherein less than all the registers in the backing register file is accessible to a particular process at one time.

10. The backing register file of claim 9, wherein the backing register file operates in one of the windowing mode or the native mode depending upon instructions in a current instruction stream of a current process, wherein when the instruction stream includes register windowing instructions, the backing register file operates in the windowing mode, and when the instruction stream does not include register windowing instructions then the backing register file operates in the native mode.

11. The backing register file of claim 7, wherein each of the plurality of registers is accessible at random using a uniquely assigned address.

\* \* \* \* \*